United States Patent [19]

Gabellieri et al.

[11] 4,416,949

[45] Nov. 22, 1983

[54] COMPOSITE PANEL COMPRISING A METAL FOIL AND A POLYOLEFINE SHEET

[75] Inventors: Rodolfo Gabellieri; René Bouteille, both of Brussels, Belgium

[73] Assignee: Solvay & Cie., Brussels, Belgium

[21] Appl. No.: 301,320

[22] Filed: Sep. 11, 1981

Related U.S. Application Data

[63] Continuation of Ser. No. 851,281, Nov. 14, 1977, abandoned.

[30] Foreign Application Priority Data

Nov. 12, 1977 [DE] Fed. Rep. of Germany ........... 76197

[51] Int. Cl.³ .............................................. B32B 15/08
[52] U.S. Cl. .................................... 428/461; 428/463; 428/464; 428/508
[58] Field of Search ............... 428/461, 462, 460, 464, 428/507, 508

[56] References Cited

U.S. PATENT DOCUMENTS

| | | |
|---|---|---|
| 3,392,045 | 7/1968 | Holub .................................. 428/461 |
| 3,468,753 | 9/1969 | Vincent et al. ...................... 428/461 |
| 3,511,750 | 5/1970 | Hider .................................. 428/464 |
| 3,565,747 | 2/1971 | Vincent et al. . |
| 3,582,452 | 6/1971 | Britton ................................ 428/461 |
| 3,647,617 | 3/1972 | Rieke .................................. 428/461 |
| 3,740,383 | 12/1969 | Gabellieri . |
| 3,883,630 | 5/1975 | Raganato et al. . |
| 4,025,593 | 5/1977 | Raganato et al. . |
| 4,189,455 | 2/1980 | Raganato et al. . |

FOREIGN PATENT DOCUMENTS

| | | |
|---|---|---|
| 260554 | 3/1968 | Austria . |
| 568524 | 5/1958 | Belgium . |
| 748724 | 10/1969 | Belgium . |
| 789804 | 4/1973 | Belgium . |
| 811780 | 9/1974 | Belgium . |
| 824844 | 12/1975 | Belgium . |
| 847491 | 4/1977 | Belgium . |
| 1951609 | 5/1970 | Fed. Rep. of Germany . |
| 2144409 | 3/1972 | Fed. Rep. of Germany . |
| 2252758 | 10/1972 | Fed. Rep. of Germany . |
| 2165115 | 10/1975 | Fed. Rep. of Germany . |
| 1236686 | 6/1960 | France . |
| 1268469 | 6/1961 | France . |

OTHER PUBLICATIONS

Abstract of Japanese Patent Application No. 7,232,133, Aug. 1972, in English language.

*Primary Examiner*—Marion McCamish
*Assistant Examiner*—E. Rollins Buffalow
*Attorney, Agent, or Firm*—Spencer & Frank

[57] ABSTRACT

The invention relates to a composite panel comprising at least one metal foil combined, by hot pressing, with at least one polyolefine sheet in which the polyolefine sheet is produced from a mixture of 10 to 90% by weight of cellulose fibres and from 90 to 10% by weight of a polyolefine modified by polar monomer units derived from at least one monomer selected from the group consisting of the unsaturated carboxylic acids, the corresponding anhydrides and their derivatives. The presence of cellulose fibres in the polyolefine improves the adhesion between the components of the composite panel.

13 Claims, No Drawings

COMPOSITE PANEL COMPRISING A METAL FOIL AND A POLYOLEFINE SHEET

CROSS REFERENCE TO RELATED APPLICATION

This application is a continuation of Applicants' co-pending U.S. application Ser. No. 851,281, filed Nov. 14th, 1977 now abandoned.

The present invention relates to a composite panel comprising at least one metal foil and one polyolefine sheet, combined with one another.

Panels wherein thermoplastics, such as sheets based on polyolefines, and metal foils are combined with one another in order to benefit from the properties of each of the constituent materials are known. Thus, in Belgian Pat. No. 748,724 filed on Apr. 9th, 1970 by BASF, it is proposed to produce a sandwich panel by combining aluminium foils with polyethylene sheets. However, in view of the lack of natural adhesion between the polyethylene and the metal, it is necessary, in order to produce this product, to resort to the use of a particular adhesive.

In order to solve more directly, and hence more economically, the problem of the adhesion between these two materials, POLYPLASTIC have proposed, in French Pat. No. 1,268,469 filed on Feb. 1st, 1960, to modify the face of the polyolefine sheet, brought into contact with the metal, by grafting of a polar monomer. According to one embodiment, the polyolefine sheet can consist totally of a polyolefine modified by grafting. However, the adhesion thus obtained is low and proves insufficient for certain applications of the panels produced in this way.

It has now been found, in accordance with the present invention, that it is possible to produce such panels, in which the adhesion between the constituent elements is remarkable, whilst avoiding having to resort to an adhesive, and whilst employing less elaborate materials than those used in the known processes.

Hence, the present invention relates to a composite panel comprising at least one metal foil combined, by hot pressing, with at least one polyolefine sheet, in which the polyolefine sheet comprises from 10 to 90% by weight of cellulose fibres and from 90 to 10% by weight of a polyolefine modified by polar monomer units derived from at least one monomer selected from the group consisting of the unsaturated carboxylic acids, the corresponding anhydrides and their derivatives.

It is particularly astonishing that the presence of cellulosic fibres in the polyolefine sheet produces a substantial improvement in the adhesion, whilst other fibrous materials, such as glass fibres, have an adverse effect on the adhesion.

By polyolefine modified with polar monomer units such as those defined above, it is intended to denote any polyolefine of which at least certain macromolecules comprise, in addition to monomer units derived from unsubstituted alpha-olefines, polar monomer units corresponding to the definition given above. Though the presence of monomer units other than those mentioned above, in the modified polyolefine, is not excluded, it is nevertheless preferred that the modified polyolefine should consist exclusively of monomer units of the two abovementioned species.

These modified polyolefines can be copolymers of at least one alpha-olefine with at least one polar monomer. These copolymers can be statistical copolymers, graft copolymers or block copolymers. However, preference is given to the graft copolymers in which the main chain (or skeleton) has a polyolefine structure and the side chains (or grafts) consist of polar monomers. The graft copolymers can be manufactured by all the known techniques of grafting such as grafting in solution, by irradiation or in the presence of initiators, and grafting by malaxating in the molten state.

The alpha-olefines from which the olefinic monomer units of the modified polyolefines are derived can be selected from amongst all the unsubstituted olefines having a double bond in the alpha-position. In general, they are chosen from amongst the monoolefines having from 2 to 6 carbon atoms in their molecule, such as ethylene, propylene, 1-butene and 4-methyl-1-pentene.

Furthermore, the modified polyolefines can contain several different alpha-olefines.

The polar monomer employed for obtaining the modified polyolefines can be any organic compound containing at least one double bond and at least one carboxyl group, which may be in the form of an anhydride. Preferably, polar monomers containing from 4 to 12 carbon atoms in their molecule are used. These polar monomers can in particular be an acrylic or methacrylic monomer such as acrylic acid, methacrylic acid and alpha-chloroacrylic acid, or an unsaturated polycarboxylic acid such as maleic acid, fumaric acid and itaconic acid, or an anhydride derived from these acids.

In general, the modified polyolefines comprise from 50 to 99 mol % of monomer units derived from alpha-olefines and preferably from 85 to 98%, the remainder consisting of the polar monomer units.

The modified polyolefine can also contain macromolecules free from polar monomer units. However, it is preferred that the proportion of such molecules should be less than 50% by weight and more particularly less than 25% by weight, of all the polyolefines present.

The modified polyolefine can contain various additives usually introduced into polyolefins, such as fillers, in particular mineral fillers, stabilisers, lubricants, antiacid agents, agents which increase the impact resistance, dyestuffs and the like. These additives are present in general at the rate of less than 50% by weight and frequently at the rate of less than 10% by weight of the polyolefine.

Particularly advantageous results are obtained with high density polyethylenes, or polypropylenes modified by grafting and containing monomer units derived from maleic anhydride.

The polyolefine can be employed in any form whatsoever during the manufacture of the composite panel. Thus it can be in the form of a powder or in the form of granules. However, it has been found that it is possible to produce a panel according to the invention, which has a fairly low density, for example of about 0.4 to 0.8 dm$^3$/kg, if the polyolefine is employed in the form of fibrillated structures.

The term "fibrillated structures" is intended to denote elongated structures consisting of very thin filaments, having a thickness of the order of one micron, connected to one another so as to form a three-dimensional network. These fibrillated structures, of fibrous appearance, have a diameter of approximately from 0.01 to 5 mm, a length of 0.1 to 50 mm and a specific surface area of at least 1 m$^2$/g and preferably of at least 10 m$^2$/g.

These structures can be obtained in accordance with any process and especially by using the processes described in Belgian Pat. No. 568,524 filed on June 11, 1958 by E. I. du PONT de NEMOURS, in Belgian Pat. No. 789,804 filed on Oct. 10, 1972 by CROWN ZELLERBACH INTERNATIONAL, in German Patent Application No. 2,252,758 filed on Oct. 27, 1972 by GULF RESEARCH and DEVELOPMENT, in German Patent Application No. 1,951,609 filed on Feb. 23, 1973 by MONTECATINI EDISON, in German Patent Application No. 2,144,409 filed on Sept. 4, 1971 by OJI YUKA GOSEISHI, in Japanese Pat. Application No. 7,232,133 filed on Sept. 19, 1969 by TORAY, or in Belgian Pat. Nos. 742,358 of Nov. 12, 1969, 787,032 and 787,033 of Aug. 1, 1972, 811,780 of Mar. 1, 1974 and 824,844 of Jan 17, 1975 in the name of Solvay & Cie.

If the structures are obtained in the form of continuous fibrillated structures, it is evidently desirable to provide a chopping or breaking-up operation, for example in a pulper, to reduce their length to the abovementioned limits.

The fibrillated structures can advantageously consist of the graft copolymer. The latter can be manufactured in accordance with various techniques. Thus, according to a first variant, the techniques described in the above-mentioned patents can be employed, using a previously grafted copolymer. According to another variant, the fibrillated structures are produced by abrupt expansion of a mixture of molten polyolefins and solvent and the polar monomer is grafted subsequently onto the fibrillated polyolefine structures thus produced, employing, for example, the technique described in French Pat. No. 1,236,686 filed on Aug. 19, 1959 by E. I. du PONT de NEMOURS. Finally, according to a third variant which is preferred, the fibrillated structures are produced directly by abrupt expansion of a mixture of molten polyolefine and of solvent containing the polar monomer and a source of free radicals, as is described in Luxembourg Patent Application No. 73,706 filed on Nov. 3, 1975 by Solvay & Cie. The conditions which prevail before expansion are suitable for bringing about the desired grafting.

According to the invention, the polyolefine sheet combined with the metal foil contains from 10 to 90% by weight of cellulosic fibres. If the polyolefine sheet contains less than 10% by weight of modified polyolefine, an excellent bond can no longer be achieved. The adhesion between the constituent elements of the panel increases in accordance with the content of modified polyolefine until a content of about 40% is reached, and then remains virtually constant. In order to obtain excellent adhesion between the constituent elements of the panel it is thus not necessary to employ an amount of modified polyolefine exceeding about 40% by weight. Finally, the polyolefine sheets can be deformed by the action of pressure and heat when the content of modified polyolefine reaches at least 35% by weight. The heat-deformability of the sheets also increases with their content of modified polyolefine.

As a result, in order to produce flat panels which do not have to undergo any subsequent thermoforming, it is advantageous, for reasons of economy, to choose a content of modified polyolefine of between 10 and 40% by weight, whilst for the production of panels which must undergo thermoforming, it is advantageous if the content of modified polyolefine is greater than 35% by weight; this content can for certain applications reach 90%.

According to one embodiment, the polyolefine sheet is combined, by one of its faces, with a metal foil and, by the other face, with a base sheet made up from a mixture of cellulosic fibres and one or more polyolefines free from polar monomer units. The base sheet can itself be combined with a second polyolefine sheet which is combined with a second metal foil. In this way, a composite panel is obtained which comprises a core formed of the base sheet, two polyolefine intermediate sheets on either side of the core and two covering metal foils. In this case the polyolefine which constitutes the base sheet and the polyolefine which constitutes the covering sheets are preferably based on the same alpha-olefines. The polyolefine intermediate sheets preferably weigh between 25 and 250 g/m$^2$.

The various techniques for forming a sheet of mixtures of cellulosic fibres and of polyolefins are well-known to specialists and can all be exploited for producing the polyolefine sheet. Thus, the polyolefine sheet can be prepared, for example, by a dry method, especially by the techniques of pneumatic web formation or web formation by gravity, malaxating-calendering, and extrusion. It is also possible to resort to the conventional papermaking method, which consists of forming the sheet from a suspension in a liquid, containing the appropriate mixture of cellulosic fibres and of polyolefine in such proportions that the solids concentration of the suspension is between 1 and 20% by weight. This method of proceeding proves very simple and makes it possible to exploit apparatus which already exists, for example in board mills. The preferred liquid for preparing the suspension is water, especially for obvious economic reasons. However, it is possible to envisage the use of other suspending liquids such as, for example, the chlorinated solvents.

According to a preferred embodiment, if the polyolefine is employed in the form of fibrillated structures, the process is started by suspending the fibrillated structures, which are in the form of a web, in water; this suspending can be facilitated by simultaneously or previously introducing a small amount of cellulosic fibres. The suspension is then subjected to a vigorous pulping treatment, for example in an apparatus of the TURMIX type, so as to break the material down to individual fibrillated structures to the maximum extent, after which the cellulosic fibres are introduced and the mixture is homogenised before proceeding to make a sheet on a papermaking machine. The sheet thus produced is advantageously drained, dried at 80°–90° C. so as to remove practically all the water, and then consolidated by heating, for example at 175°–190° C. under a pressure of 10 to 150 kg/cm$^2$.

The cellulosic fibres present in the composition of the polyolefine sheet can be employed in any sufficiently divided form. Thus, it is possible to employ particles or fibres of deciduous or coniferous wood, sawdust, straw waste, paper pulp or chopped-up waste paper, in order to prepare the mixture.

The combined metal foil or foils can be of any type. Thus, by way of example, it is possible to use foils of aluminium, iron, steel, copper, zinc or titanium and foils of alloys of these metals. Obviously, it may prove useful to subject these foils to an anti-corrosion treatment beforehand. It is also advantageous if the face of these foils which is combined with the polyolefine sheet is as clean as possible. Thus, it may be advisable correctly to degrease the face of these foils, for example by treatment with a chlorinated solvent. It is also possible to treat these foils by sand-blasting.

The panel according to the invention can advantageously be of the sandwich type and comprise a core consisting of a polyolefine sheet between two identical or different metal foils, or vice versa. However, numerous other combination variants can be envisaged, depending on the properties which it is desired to obtain.

The adhesion between the metal foil and the polyolefine sheet depends to a certain degree on the thickness or weight per unit area of these foils and sheets. Thus, the adhesion between the two constituents is increased if the thickness of the metal foil increases from 0.1 mm to 0.2 mm and hence metal foils having a thickness of at least 0.1 mm are preferred.

The various constituents of the panel are assembled in general by pressing under a pressure of 1 to 100 kg/cm$^2$ and at a temperature which is 10° to 100° C. above the melting point of the modified polyolefine employed.

After the hot pressing, it is preferable to carry out a cold compression under a pressure of 1 to 50 kg/cm$^2$ and at a temperature of between 5° and 50° C.

If the modified polyolefine is based on ethylene, the hot compression is carried out at a temperature of between 170° and 200° C. The cold compression is generally carried out at ambient temperature or at a lower temperature.

The duration both of the hot compression and of the cold compression is chosen in accordance with the weight per unit area and can vary within wide limits. In general it is between 1 and 20 minutes.

It is preferable that the cold compression should be carried out directly after the hot compression to avoid a reduction in the adhesion between the constituents, and even to avoid local adhesion flaws.

The combination can be carried out discontinuously or semi-continuously by means of fixed or movable presses.

During combination, it is also possible to thermoform the panel and impart a particular profile to it at the same time.

The adhesion between the sheets and foils of the composite panel is remarkable. It is rather insensitive to variations in temperatures; the panel according to the invention will withstand temperatures of the order of 110° C. as well as temperatures below −40° C. Furthermore, it has been found that the panel according to the invention exhibits a resistance to creep which is very significantly improved compared to the panels which do not contain cellulosic fibres.

The panel of the invention can easily be subjected subsequently to mechanical working operations such as stamping, chamfering, piercing, milling, riveting and tapping.

In particular, it lends itself particularly well to cold deformation treatments such as folding, bending and shallow press-forming, if the polyolefine sheet is produced from a mixture containing from 2 to 15% by weight of a synthetic elastomer such as, for example, a rubbery copolymer based on ethylene and on propylene.

Finally, the panel according to the invention, of the sandwich type, in which the polyolefine sheet constitutes the core has remarkable resistance to water absorption, which resistance can be made virtually complete by grinding the edges of the panel. The degree of swelling in water is zero.

The exposed face of the metal foil can receive a layer of a decorative varnish such as an acrylic varnish or a varnish based on epoxide resin. It is also possible to apply, to this face, a decorative coating consisting of an optionally decorated sheet of synthetic paper containing at least 20%, by dry weight, of fibrillated copolymer structures as defined above, which sheet is combined with the metal during the pressing operations required to form the panel.

It is also possible to exploit the thermoforming capacity by applying the stamping (embossing) technique, which makes it possible to produce natural or painted decorative components.

The panel according to the invention can be used for numerous applications such as, for example, the production of doors, ceilings, partitions, road or railway sign panels, decorative panels, car accessories and the like. It is furthermore characterised by remarkable thermal and acoustic insulating properties.

EXAMPLE 1

Fibrillated structures of short length are produced by subjecting a mixture comprising 920 parts by weight of technical grade hexane, 80 parts by weight of high density polyethylene (trademark ELTEX, type A1050, produced and sold by Solvay & Cie), 4 parts by weight of maleic anhydride and 0.4 part by weight of di-tert.-butyl peroxide, the mixture being under a pressure of 80 kg/cm$^2$ and at a temperature of 195° C., to abrupt expansion through a spinneret such as that described in the abovementioned Belgian Patent 824,844.

The fibrillated structures of polyethylene grafted with maleic anhydride, thus obtained, have a maximum length of 2.6 mm and a specific surface area of 17 m$^2$/g. They are recovered in the form of a wet web in an apparatus such as that described in Belgian Pat. No. 787,890 filed on Aug. 23, 1972 by Solvay & Cie.

The web is then suspended in water and subjected to a vigorous pulping treatment in a TURMIX pulper, possessing sharpened blades, revolving at 2,850 rpm. This treatment is continued for 5 minutes in order to individualize the fibrillated structures.

Cellulosic particles are then incorporated into the suspension in such a way that the suspension contains 30%, by dry weight, of fibrillated structures and 70%, by dry weight, of cellulosic particles, and that the solids concentration of the suspension is 10%.

The cellulosic particles consist of FABOIS type SDB beechwood scrap, having a mean diameter of 465 microns.

The suspension is then subjected to a gentle homogenising treatment by reducing the speed of the pulper to 1,450 rpm for 2 minutes.

The suspension is then filtered through a metal gauze and is afterwards dried at 80° C. so as to give a virtually dry cake.

An aluminium foil 0.1 mm thick is applied to the two faces of the cake and the whole is placed between the platens of a heated press. The platens are kept at 175° C. and the cake provided with the aluminium foils is subjected to a pressure of 30 kg/cm$^2$ for 7 minutes and 30 seconds.

The combination is then withdrawn from the press and placed between the platens of a press kept at ambient temperature by water circulation. The combination is subjected to a pressure of 15 kg/cm$^2$ for 3 minutes.

The composite panel is then withdrawn from the press and the adhesion between the polyolefine sheet and the metal foils is tested in accordance with Standard Specification ISO R 252 modified in respect of the angle of traction, which is 90° in place of 120°, and the traction rate, which is reduced to 50 mm/min. The core weighs 2 kg/m². The adhesion measured is 1.71 kgf/cm and is recorded in Table I given later.

EXAMPLES 2 to 10

The procedure of Example 1 is followed, but varying either the composition of the sheet constituting the core of the panel, or the thickness or nature of the metal foils or the weight per unit area of the sheet which constitutes the core of the panel.

The modified parameters are recorded in Table I below, which also mentions the adhesion between the polyolefine sheet and the metal foils, in accordance with the modified Standard Specification ISO R 252. On examining the table, it is found that the adhesion increases greatly with the content of fibrillated structures and does so up to a content of about 40%. This adhesion also increases with the weight per unit area of the core, up to a value of the order of 3 kg/cm², and in accordance with the nature and thickness of the metal foils.

TABLE I

| EX-AM-PLES | Metal foils nature | thick-ness:mm | compos-ition, % fibrids-wood | weight per unit area kg/m² | Adhesion Standard Spec-ification ISO R 252 kgf/cm |
|---|---|---|---|---|---|
| 1 | aluminium | 0.1 | 30-70 | 2 | 1.71 |
| 2 | aluminium | 0.1 | 37.5-62.5 | 2 | 1.71 |
| 3 | aluminium | 0.1 | 37.5-62.5 | 3 | 3.03 |
| 4 | aluminium | 0.1 | 37.5-62.5 | 4 | 3.05 |
| 5 | aluminium | 0.1 | 37.5-62.5 | 5 | 3.27 |
| 6 | aluminium | 0.2 | 37.5-62.5 | 3 | 5.27 |
| 7 | iron | 0.2 | 20-80 | 2 | 1.91 |
| 8 | iron | 0.2 | 30-70 | 2 | 3.10 |
| 9 | iron | 0.2 | 37.5-62.5 | 2 | 3.21 |
| 10 | iron | 0.2 | 37.5-62.5 | 3 | 6.34 |

EXAMPLE 11 (comparative)

The procedure of Example 2 is followed, except that the fibrillated structures used are prepared by abrupt expansion of a mixture which contains neither maleic anhydride nor di-tert.-butyl peroxide.

It is found after cold pressing that the metal foils have no adhesion whatsoever to the polyolefine sheet.

EXAMPLE 12

A composite panel is produced as in Example 1, apart from the fact that during production of the fibrillated structures, the polyethylene grafted with 4 parts of maleic anhydride is replaced by a random copolymer of ethylene and acrylic acid, containing 4 parts of acrylic acid, and the solvent is replaced by a 70/30 mixture of methylene chloride and pentane.

It is found after cold pressing that the metal foils adhere perfectly to the polyolefine sheet.

EXAMPLE 13

The procedure of Example 1 is followed, but using fibrillated structures prepared by abrupt expansion, through a disturbance spinneret, of a mixture comprising 609 parts by weight of methylene chloride, 261 parts by weight of pentane, 130 parts by weight of polypropylene (PROFAX 6501 produced and sold by HERCULES POWDERS), 6.5 parts by weight of maleic anhydride and 2.6 parts by weight of di-tert.-butyl peroxide.

After cold pressing, it is found that the adhesion between the metal foils and the polyolefine sheet is excellent.

EXAMPLE 14-17

Using fibrillated structures of non-grafted polyethylene such as those produced in accordance with Example 11, core sheets are produced in accordance with the technique described in Example 1 from an aqueous suspension containing 37.5%, by dry weight, of fibrillated structures and 62.5%, by dry weight, of cellulosic particles.

In addition, using fibrillated structures of grafted polyethylene such as those produced in accordance with Example 1, intermediate sheets containing, by dry weight, 50% of fibrillated structures and 50% of wood fibres (bleached coniferous Kraft pulp) are produced by the conventional papermaking method. The sheets produced weigh 50 or 100 g/m².

To each face of the core sheets is applied an intermediate sheet and then a metal foil (0.1 mm thick aluminium or 0.2 mm thick iron), after which the hot pressing, followed by cold pressing, is carried out as described in Example 1. It is found that the metal foils adhere suitably by virtue of the intermediate sheets.

Table III below gives the characteristics of the various composite panels produced, as well as their properties.

TABLE III

| Examples | Metal foils Nature | Thickness mm | Weight per unit area of the intermediate sheets g/m² | Weight per unit area of the panel g/m² | Thickness of the panel | Water absorption in 24 hours % | Breaking load under tension kg/cm² | Elongation at break % | Flexural modulus E kg/cm | Adhesion ISO R 252 kgf/cm | Rigidity of the panel per unit width kgf/mm |
|---|---|---|---|---|---|---|---|---|---|---|---|
| 14 | Aluminum | 0.10 | 50 | 2,550 | 2.35 | 0.6 | 278 | 1.5 | 56,950 | 2.34 | 509 |
| 15 | Iron | 0.20 | 50 | 5,160 | 2.50 | 0.8 | 659 | 6.2 | 131,800 | 4.30 | 1556 |
| 16 | Aluminum | 0.10 | 100 | 2,555 | 2.30 | 0.4 | 294 | 1.7 | 67,440 | 2.53 | 653 |
| 17 | Iron | 0.20 | 100 | 4,670 | 2.30 | 0.4 | 701 | 4 | 120,420 | 3.37 | 1675 |

EXAMPLE 18

A composite panel is produced in accordance with the procedure given in Example 1, apart from the fact that the pressure exerted both during hot pressing and during cold pressing is limited to 2 kg/cm².

The composite panel thus obtained has a thickness of 3 mm and its density is 0.63 kg/dm³. The adhesion between the constituent materials is excellent.

EXAMPLE 19

6 successive mixtures containing 62.5% by dry weight of FABOIS type SDB beechwood scrap (mean size: 465 microns) and 37.5% of grafted polyethylene fibrillated structures prepared in accordance with the technique described in Example 1 are prepared in a pulper. In each of the operations, 6 kg of solids are employed. The mixtures are produced at a concentration of 3% and the duration of stirring is 5 minutes.

The successive mixtures are introduced into stock vats where they are diluted to 2%.

The mixture is then converted to a sheet on a papermaking machine under the following conditions.
Concentration of the pulp: 2% of solids
Feed rate: 32 l/min.
Speed of the machine: 2 m/sec.
Pressure in the wet press: 50 kg/linear cm.
Temperature of the six driers: 100° to 110° C.
Two reels of 36 m and of 50 m are thus produced.

After drying in a ventilated BEKSO oven (±72 hours) the following are found:
Dryness on reeling up: 70of solids
Weight per unit area: 960 to 1,040 g/m².

The sheets thus prepared can, without difficulty, be covered with stainless steel, aluminium or tinplate under the following conditions:

| Hot pressing: | temperature 175° C. |
| | pressure: 20 kg/cm² |
| | duration: 3 minutes |
| Cold pressing: | temperature: ambient |
| | pressure: 20 kg/cm² |
| | duration: 2 minutes |

In each case the adhesion between the sheets constituting the sandwich is excellent.

EXAMPLE 20-25

Following the procedure of Example 1, composite panels are produced, varying the contents of fibrillated structures and of cellulosic fibres and the nature of the cellulosic fibres as indicated in Table IV below. After having carried out the hot pressing and cold pressing, the adhesion values are measured in accordance with the method explained in Example 1. Table IV gives the adhesion values measured in accordance with the Standard Specification indicated in Example 1.

shows the increase in adhesion achieved by virtue of the presence of cellulosic fibres in the polyolefine sheet.

EXAMPLE 26 (COMPARATIVE)

The procedure followed is as in Example 21, but with the unbleached Kraft pulp replaced by glass fibres of type OCF K 885 AA ¼". The adhesion measured after pressing is 0.16 kgf/cm.

EXAMPLE 27

A mixture comprising 60% by weight of beech scrap and 40% by weight of a high density polyethylene (ELTEX A1050) containing 5%, by weight of the polymer, of maleic anhydride and 0.5%, by weight of the polymer, of dicumyl peroxide is treated for 5 minutes on a TROESTER mill, the rolls of which are kept at 140° C. The mixture is then sheeted directly by passing through a calendar with 4 rolls arranged in a L, the rolls also being kept at 140° C. The sheet obtained has a thickness of 2 mm and its content of grafted maleic anhydride is 5.7%.

An 0.1 mm thick aluminium foil is applied to the two faces of the sheet thus obtained and the combination is placed between the platens of a heated press. The platens are kept at 175° C. and the combination is subjected to a pressure of 30 kg/cm² for 7 minutes. The combination is then withdrawn from the press and placed between the platens of a press maintained at ambient temperature by water circulation. The combination is there subjected to a pressure of 15 kg/cm² for 3 minutes. After extraction, the adhesion between the constituent elements is measured in accordance with the method explained in Example 1. The measured adhesion is 2.35 kgf/cm.

EXAMPLES 28-30

Following the procedure of Example 1, three composite panels (sandwiches) are produced, of which the compositions of the cores are given in Table V below whilst the covering foils are 0.1 mm thick aluminium foils. After pressing at ambient temperature, identical specimens are cut from the various panels and are subjected to an identical flexural creep test at 25° C. Table V shows the deflections measures in mm on the samples after being subjected to identical loads for 1 minute, 30 minutes, 1 hour, 5 hours and 24 hours. Example 28 is not included in the scope of the invention and is given by way of comparison to demonstrate the advance achieved by virtue of the invention in respect of the resistance to creep under load. The lower part of Table V gives, as a percentage, the gain achieved by virtue of the presence of cellulosic particles, by comparison with the results of Example 28.

TABLE IV

| EXAMPLES | CONTENT OF FIBRILLATED STRUCTURES % | CONTENT OF LOSIC FIBRES % | NATURE OF THE CELLULOSIC FIBRES | ADHESION kgf/cm |
|---|---|---|---|---|
| 20 | 100 | 0 | — | 0.57 |
| 21 | 40 | 60 | UNBLEACHED KRAFT pulp | 1.52 |
| 22 | 40 | 60 | POPLAR SCRAP | 3.08 |
| 23 | 40 | 60 | D40/80 SCRAP (SPRUCE + POPLAR) | 2.02 |
| 24 | 40 | 60 | R80/10 SCRAP (OAK + BEECH) | 2.23 |
| 25 | 40 | 60 | H80 SCRAP (BEECH) | 2.26 |

Example 20 is given by way of comparison and is excluded from the scope of the invention. This example

TABLE V

| Composition of the core: | 28 | 29 | 30 |
|---|---|---|---|
| Content of grafted polyethylene, % | 100 | 40 | 40 |
| Wood: type | — | poplar | cellulose |
| content % | — | 60 | 40 |
| Creep at 25° C.: | | | |
| deflection in mm after | | | |
| 1 minute | 0.64 | 7.59 | 6.31 |
| 30 minutes | 10.69 | 8.56 | 6.51 |
| 1 hour | 11.03 | 8.67 | 6.63 |
| 5 hours | 12.41 | 9.22 | 6.97 |
| 24 hours | 13.68 | 10.21 | 760 |
| Gain in % | | | |
| 1 minute | — | 21.3 | 34.5 |
| 30 minutes | — | 19.3 | 39.1 |
| 1 hour | — | 21.2 | 39.3 |
| 5 hours | — | 25.7 | 43.8 |
| 24 hours | — | 25.4 | 44.4 |

We claim:

1. Composite panel comprising at least one metal foil combined, directly by hot pressing without any adhesive, with at least one polyolefine sheet, the polyolefine sheet comprising from 10 to 90% by weight of cellulose fibres and from 90 to 10% by weight of a polyolefine modified by polar monomer units derived from at least one organic compound containing at least one double bond and at least one carboxyl group, which may be in the form of an anhydride.

2. Composite panel according to claim 1, wherein the modified polyolefine is a copolymer of at least one alpha-olefine with at least one polar monomer.

3. Composite panel according to claim 2, wherein the copolymer is a graft copolymer in which the main chain has a polyolefine structure and the side chains consist of polar monomers.

4. Composite panel according to claim 1, wherein the modified polyolefine contains monomer units derived from unsubstituted alpha-olefines selected from monoolefines of which the molecule contains from 2 to 6 carbon atoms.

5. Composite panel according to claim 1, wherein the monomer is selected from the group consisting of acrylic monomers, methacrylic monomers, the unsaturated polycarboxylic acids and the corresponding anhydrides.

6. Composite panel according to claim 5, wherein the modified polyolefine is a high density polyethylene or a polypropylene and the monomer is maleic anhydride.

7. Composite panel according to claim 1, wherein the modified polyolefine is in the form of fibrillated structures.

8. Composite panel according to claim 1, wherein the metal foil is produced from a metal selected from the group consisting or iron, aluminium, copper, zinc, titanium and their alloys.

9. Composite panel according to claim 1, wherein the panel consists of a polyolefine sheet enclosed between two metal foils.

10. Composite panel according to claim 1, wherein the panel is thermoformed.

11. Composite panel according to claim 1, wherein the modified polyolefine contains 50 to 99% monomeric units derived from alphaolefines, with the remainder consisting of the polar monomer units.

12. Composite panel according to claim 1, wherein the monomer is maleic anhydride.

13. Composite panel according to claim 12, wherein the modified polyolefin is a high density polyethylene.

* * * * *

UNITED STATES PATENT AND TRADEMARK OFFICE
CERTIFICATE OF CORRECTION

PATENT NO. : 4,416,949
DATED : November 22, 1983
INVENTOR(S) : Rodolfo Gabellieri et al It is certified that error appears in the above—identified patent and that said Letters Patent is hereby corrected as shown below:

In the heading of the patent, under [30] Foreign Application Priority Data, after Nov. 12, change "1977 [DE] Fed. Rep. of Germany" to --1976 [LU] Luxembourg--.

*Signed and Sealed this*

*Twenty-eighth* Day of *February 1984*

[SEAL]

*Attest:*

GERALD J. MOSSINGHOFF

*Attesting Officer*   *Commissioner of Patents and Trademarks*